United States Patent
Birsner (10) Patent No.: US 7,159,508 B1
(45) Date of Patent: Jan. 9, 2007

(54) TANK PISTON SEAL AND STABILIZING SYSTEM

(75) Inventor: Michael F. Birsner, 2912 Fox Run Dr., Godfrey, IL (US) 62035

(73) Assignee: Michael F. Birsner, St. Louis, MO (US)

(*) Notice: Subject to any disclaimer, the term of this patent is extended or adjusted under 35 U.S.C. 154(b) by 0 days.

(21) Appl. No.: 11/246,805

(22) Filed: Oct. 11, 2005

(51) Int. Cl.
*B67D 5/42* (2006.01)
*F16J 1/06* (2006.01)

(52) U.S. Cl. ......................................... 92/205; 222/389
(58) Field of Classification Search ................. 92/205, 92/249; 222/386, 389
See application file for complete search history.

(56) References Cited

U.S. PATENT DOCUMENTS

| | | | |
|---|---|---|---|
| 4,721,235 A * | 1/1988 | Watson | 222/389 |
| 5,114,054 A | 5/1992 | Watson | |
| 5,341,726 A * | 8/1994 | Watson | 222/389 |
| 5,746,112 A | 5/1998 | Watson | |
| 6,027,123 A * | 2/2000 | Berry et al. | 277/434 |
| 6,325,384 B1 * | 12/2001 | Berry et al. | 277/437 |
| 6,916,025 B1 * | 7/2005 | Brisson | 277/637 |

* cited by examiner

*Primary Examiner*—Thomas E. Lazo (57) ABSTRACT

An improved seal and stabilizing system for a piston head in a tank cylinder provides a better mechanism for discharging and wiping a cylinder when heavy liquids such as chocolate or peanut butter are being dispensed. The seal system now includes a free-floating block inside the seal and grooves in the inner lower part of the hollow seal. The block and grooves keep the upper, outer part of the seal from deforming away from the inner surface of the cylinder that facilitates complete discharging and wiping of the material from the cylinder tank. The tensioning mechanism of the seal is made from a unitary and annular ring T-ring that easily slides on the rear surface of the piston head. In order to stabilize the movement of the piston head down the cylinder, clockwise and counterclockwise springs are provided for the stabilizing shoes. The dual spring arrangement prevents coil binding of the springs. The springs and stabilizing shoes maintain the piston head cross section parallel to the cross section of the cylinder.

11 Claims, 6 Drawing Sheets

TANK PISTON SEAL AND STABILIZING SYSTEM

BACKGROUND OF THE INVENTION

This invention relates to the field of fluid transportation and dispensing. More particularly, fluids and thick viscous materials are dispensed from a tanker truck by means of an air-powered piston. A new and improved seal and stabilizing system is described.

In the manufacturing field of transporting liquids or viscous materials such as oil, chocolate, peanut butter, or other thick materials, large trucks are often used. The truck tanks have a generally circular cross section and are cylindrical in form. The long tank cylinder has an outlet/inlet at one end, usually the far rear end of the tanker trailer and tractor combination. A thick viscous material may be loaded into the generally cylindrical tank at the inlet port. As the material is loaded, a piston, which generally has a shape identical to the circular cross section of the tank cylinder, is pushed towards the rear of the cylinder by the material being loaded. In this instance, the rear of the cylindrical tank is located nearest the tractor of the tractor-trailer combination.

In order to unload the desired viscous material, such as chocolate or peanut butter, air pressure is introduced at the tractor (rear) end of the tank cylinder. The air pressure utilized in pushing the piston towards the inlet/outlet port is approximately seven to eight pounds per square inch. This air pressure drives the piston forward (towards the outlet end of the cylinder) thus discharging the material as desired.

In this particular field, one common problem encountered is the failure of the piston to drive all of the material towards the outlet as the piston moves towards the outlet. Another drawback is that the material itself should be fully discharged and the piston should have cleaning and wiping action as it moves.

A main object of this invention is to provide an annular seal for a tank piston that may be tightened against the inner surface of the cylinder for full discharge of the material.

One method of ensuring the full discharge of the material and the wiping action of the piston is to provide a flexible annular seal between the outer circumferential edge of the piston surface and the inner surface of the cylindrical holding tank. However, many problems are associated with this type of seal and many attempts have been made to perfect the seals.

Flexible piston seals have been utilized to approximately conform the annular piston seal to the contours of the inner cylindrical tank. However, often these commonly used prior art seals will tear away from the piston head, causing leakage of the material and an imperfect seal. It is another object of this invention to provide an annular seal that does not tear away from the piston head when it is used to discharge a heavy viscous material.

Another problem encountered in this art but not yet solved, is that the seal, when totally compressed, becomes concave, thus reducing the effectiveness of the seal. It is yet another object of this invention to prevent a flexible annular piston seal from becoming concave by reinforcing the front leg of the seal.

Yet another problem with the prior art seals is that compressing the flexible piston seal creates a binding effect which, in turn, causes the seal to move vertically up or down in an erratic, rather than smooth, fashion. It is a still another object of this invention to provide a compression method for a piston tank seal that allows the seal to operate in a smooth and predictable fashion.

Since the tank piston is a free moving element, stabilizing the piston to keep the circular cross-section of the piston parallel to the circular-cross section of the tank cylinder. In order to do this, anti-canting devices have been utilized in the industry. However, these anti-canting devices often times become "coil bound". A coil bound shoe (anti-canting device) is a shoe in which the compression spring bottoms out so that there is no longer any compression or tensioning in the spring. The springs used heretofore were too weak to accomplish the function correctly. It has been found that springs of 40 pound strength were too small to function properly. By increasing the strength of the spring and by using an inside and outside spring it has been found, after much experimentation, that the "coil binding" effect may be eliminated. It is a still further object of this invention to provide a stabilizing system for a tank piston in which the stabilizing shoes are free from coil binding and are much more stable than the systems currently in use.

Other and further objects of this invention will become obvious upon reading the below described specification.

BRIEF DESCRIPTION OF THE INVENTION

A generally cylindrical tank piston rides within a cylindrical tank. The outer circumferential edge of the piston is slightly smaller than the inner circumference of the tank cylinder. A flexible seal is provided between the piston and the tank. The seal may be expanded or reduced in thickness to seal the piston and the inner surface of the tank cylinder. The front leg of the seal is double banded to prevent to the front of the seal from tearing away from the metal lip of the piston. A 60 durometer block of hard polyurethane is also provided to prevent any part of the seal from caving in. The compression mechanism comprises a single, sliding T-section adjacent to the rear leg of the seal. The unitary T-section may be tightened by a compression spring to conform the upper seal surface to the lower surface of the tank cylinder. Two parallel sets of stabilizing shoes help to keep the radial axis of the tank and piston aligned. These shoes have a counterclockwise spring and a clockwise spring to prevent coil binding of the springs as the springs are compressed. By increasing the strength of the springs from those commonly used in the industry (from 40 pounds to 160 pounds) and by using an inside wound clockwise and an outer wound counterclockwise spring, the problem of coil binding is eliminated.

DETAILED OF THE PREFERRED EMBODIMENT

Figure 1:
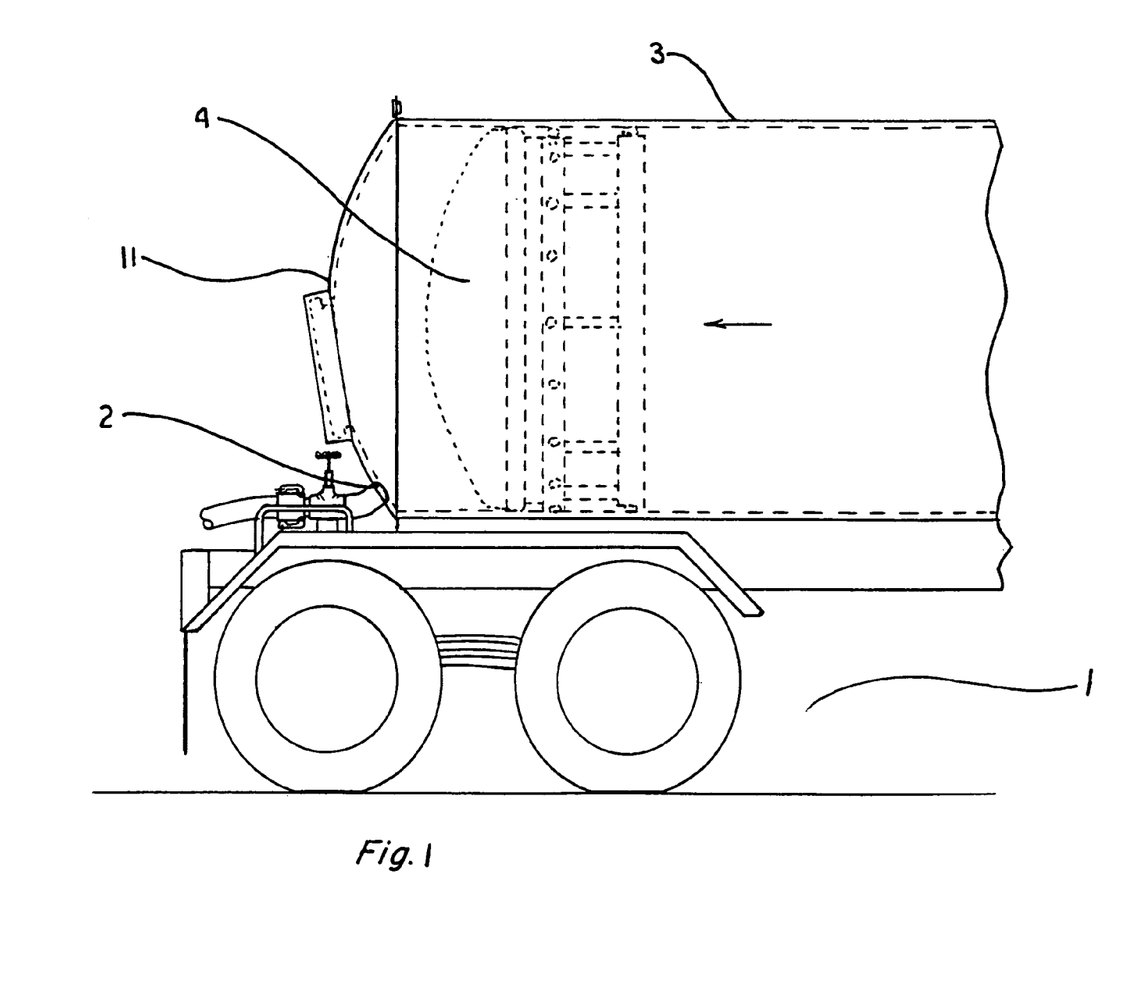
FIG. 1 shows the outlet end of a cylindrical tanker truck with the inner piston mechanism in phantom lines.
Figure 2:
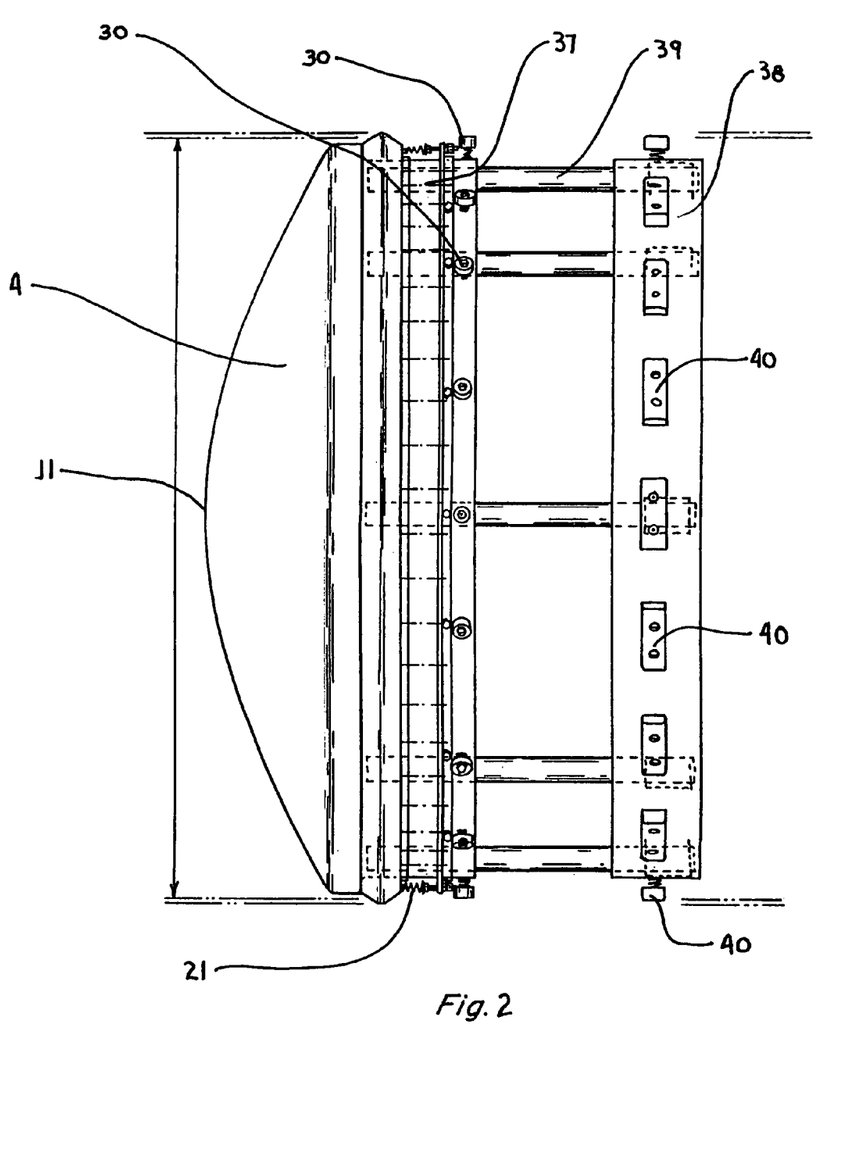
FIG. 2 is a side view of the piston and stabilizing system.
Figure 3:
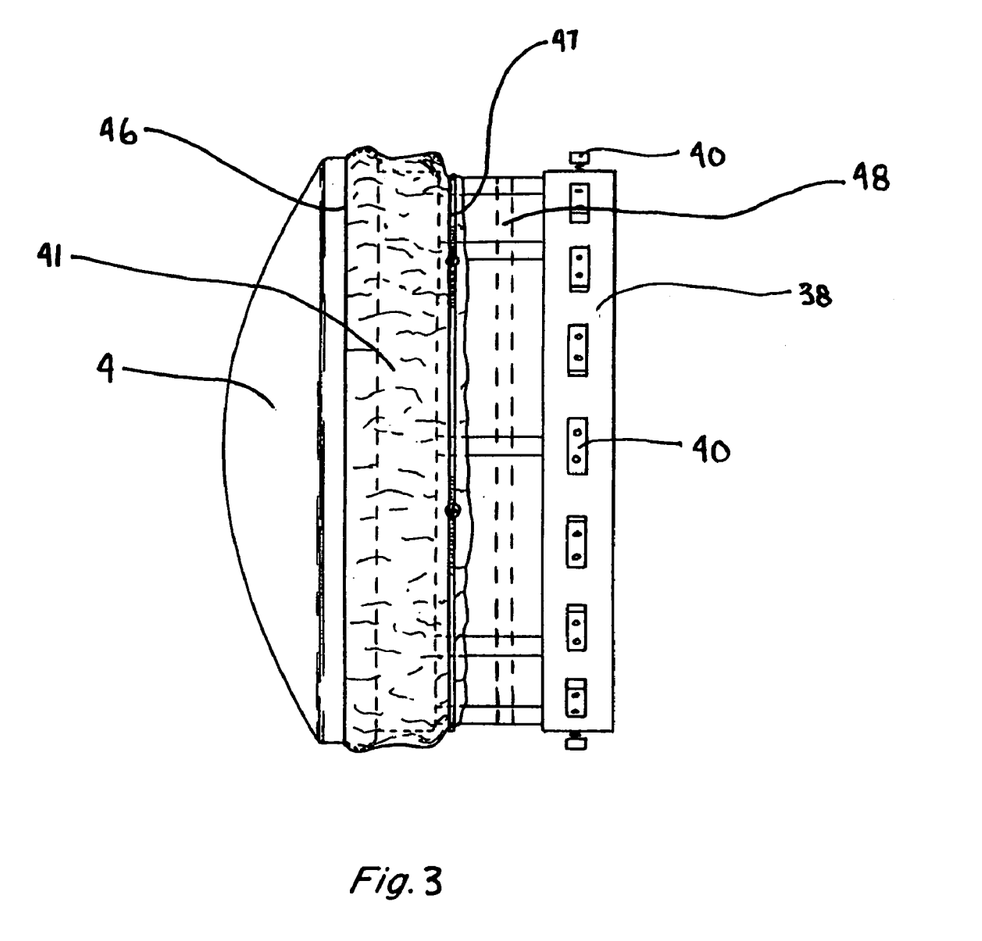
FIG. 3 is a side view of the piston and stabilizing system showing the Teflon™ cover.

Heavy viscous material such as chocolate or peanut butter is transported in a tractor-trailer 1 as best shown in FIG. 1. This tractor-trailer has an inlet/outlet 2 near one end of the outer container shell or tank cylinder 3. Located within the tank cylinder 3 is a piston head 4. The general irregularly shaped parts of the piston head are also shown in FIGS. 2 and 3. The front surface of the piston is curved, and tapers outwardly to a larger circular cross-section. The sides and rear of the piston head are flat and a smaller cylindrical rear head body is integral with the front of the piston head. The piston head 4 moves axially in the tank 3. The circular cross-section of the tank 3 is slightly larger than the outer diameter of the largest circular cross-section of the piston head. A sealing mechanism is described below that includes the piston head, seal, and supporting and tightening elements.

Figure 4:
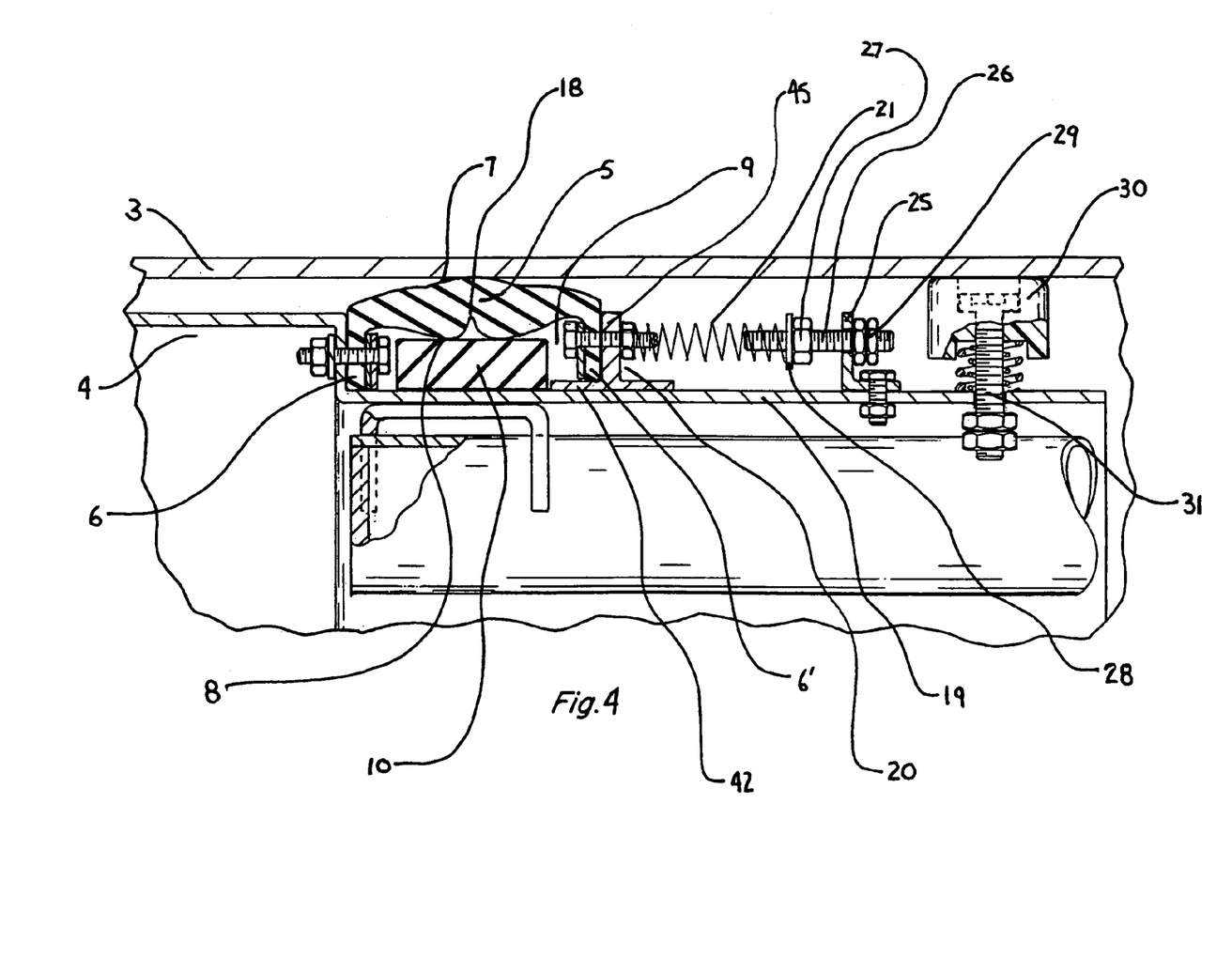
FIG. 4 is an enlarged cut-away view of the piston seal-system.

Turning to FIG. 4, the internal flexible seal 5 is shown. This flexible seal 5 has an irregularly shaped upper body 44 as shown. The seal has an arcuate convex outer surface 7. The seal also includes a front leg 6 and a rear leg 6'. The front leg 6 is permanently affixed to the back surface of the piston head as will be described later. The seal is made of any type of suitable flexible material such as neoprene or synthetic rubber. It usually has a hardness of 60 durometers on the Shore A scale.

The seal 5 is located on the back surface 12 of the front head 4 between the smaller rear head body 19 and tank cylinder 3.

The piston head seal 5 has an outer surface 7 that is designed to remain in flush and steady contact with the inside edge of the tank cylinder 3. The seal also has an irregularly shaped inner surface 8. Between the inner surface 8 of the head seal 5 and the rear piston body 19 is a hollow area 9. Inside this hollow area 9 is a head seal inner area stabilizing block 10. This block has a generally rectangular cross-section as shown and is generally free floating. The block 10, in the preferred embodiment, is approximately two and one-half inches in length and seven-eighths inches in height. However, these dimensions are meant as an illustration of the preferred embodiment only and not as a limitation. The block 10 is made of 60 durometer hardness polyurethane. The block 10 is unique to this invention and insures that the inner surface 8 of the head seal 5 does not compress to the point where the outer surface 7 of the seal is separated from the tank cylinder 3.

The piston head front surface 11, shown generally in FIGS. 1–3, is curved rather than flat. The sides and back surface 12 of the piston head 4 are flat, however. The back surface 12 is perpendicular to the tank cylinder outer surface 3, as shown in drawing FIGS. 4 and 5.

Figure 5:
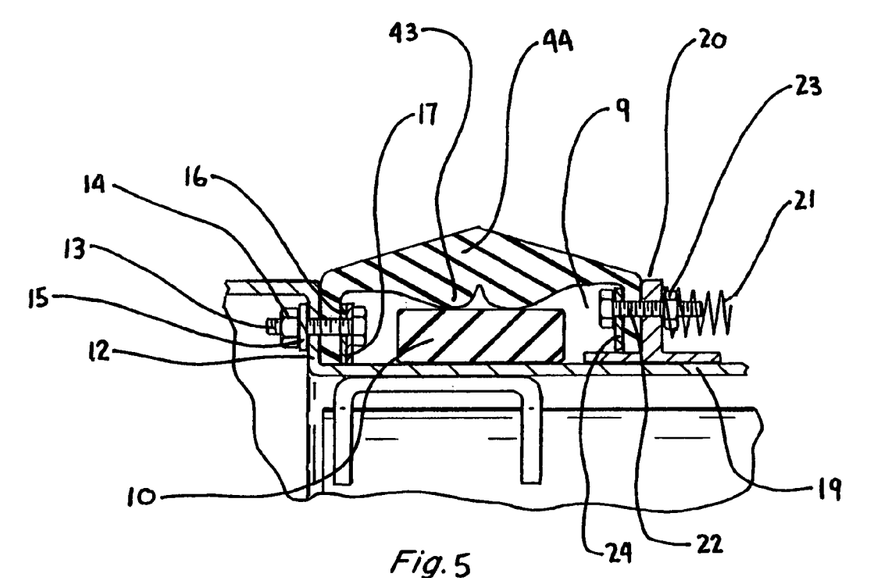
FIG. 5 is a cut-away view of the seal system and seal tensioning mechanism.

Turning now to the structure and function of the head seal, attention is drawn to FIGS. 4 and 5. As shown on FIG. 5, a head seal securing bolt 13 runs parallel to the outer tank cylinder surface and through the piston head back surface 12. Seal securing nut 14 and seal securing nut washer 15 are used to secure the head seal securing bolt 13.

Located on the inside side of front leg 6 are two hard stainless steel annular rings. These front leg annular rings 16 and 17 are connected to the front leg 6 and the flat back surface 12 by nut 14 and bolt 13 as shown. These annular rings are provided to ensure that the seal will not tear away from the metal back surface 12 of the piston head 4. These two inner front 16 and rear 17 stainless steel rings provide sufficient reinforcement to prevent the common breakdowns of the seal which have plagued the industry. The front 16 and rear 17 stainless steel rings are annular rings located around the outer surface of the rear piston head body 19 as shown on FIGS. 4 and 5. The annular rings 16 and 17 are made of passivated stainless steel and are chemically resistant.

In the prior art, when the upper body of the head seal 5 was compressed, the body would buckle and not conform to the inner surface of the tank cylinder shell 3. In order to prevent this, two new innovative elements have been added.

Figure 6:
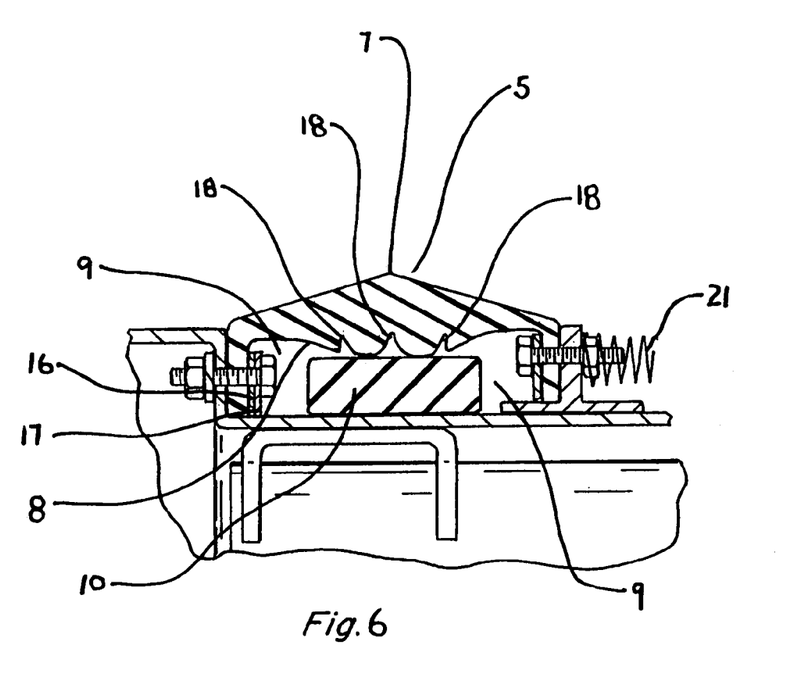
FIG. 6 is a side cut-away view similar to that of FIG. 5, showing an alternative embodiment with three grooves rather than one as shown in FIG. 5.

At least one inner groove 18 is provided near the central portion of the inner surface 8 of the head seal. This groove 18 is cut from the inner, lower surface 8 and the lower part 43 of the upper body 44 of the seal 5. This groove 18 allows the seal 5 to be compressed yet will not deform the inner part of the seal such that the outer surface 7 of the seal loses contact with the tank cylinder shell 3. As shown alternatively in FIG. 6, there could be three or more grooves cut in the lower portion 43 of the seal while still keeping within the spirit and disclosure of this invention. These grooves allow the seal to relax more easily as they are adjusted.

In addition to the head seal inner grooves 18, a head seal inner area 9 free floating block 10 also provides support for the inner surface 8 of the head seal. This additional support provides critical reinforcement for the seal 5. The reinforcement insures that the outer surface 7 of the head seal is in close discharging and wiping contact with the lower part of the outer container shell 3.

As best shown in FIGS. 4 and 5, the piston head 4 includes a rear piston head body 19. This rear piston head body 19 is perpendicular to the piston head back surface 12 and is of a generally cylindrical configuration. In the preferred embodiment, the piston head 4, sides, rear piston back surface 12 and rear piston head body 19 are one continuous piece and are made of a strong metal.

Attached to the rear piston head body 19 is a one-piece, T-shaped, slidable rear seal-tensioning ring 20. This seal-tensioning ring 20 is an annular ring that is located above the outer surface of the rear piston head body 19 as shown in FIGS. 4 and 5. However, contrary to the prior art tensioning means, the instant annular ring has a unitary integral structure with a lower slidable base 42 and an upper perpendicular leg 45. The unitary construction of this element allows the seal to move vertically up or down in a smooth, consistent manner. By using a T-configuration for the tensioning ring, instead of two separate elements, the seal moves smoothly and does not bind. Smooth sliding of the seal-tensioning annular ring 20 along the surface of the rear piston head body 19 allows the seal to operate in a smooth and efficient fashion. The addition of the annular ring T-element is a great improvement over the prior art seals and tensioning mechanisms.

The seal-tensioning annular ring 20 is tensioned by a compression spring 21. A seal-tensioning ring bolt 22 is located through the rear leg 6' of head seal 5 and is secured to outside of the rear leg 6' by nut 23 and washer 24.

A tensioning brace 25 is attached to the rear piston head body 19 as best shown in FIG. 4. A tightening bolt 26 runs through the tensioning brace 25 and is parallel to the rear piston head body surface 19. The tightening bolt 26 includes a tightening nut 27 and tightening washer 28 attached near the spring end of the bolt. Tightening bolt 26 is secured to tensioning brace 25, and ultimately to the rear piston head body 19, by tightening-bolt securing nuts 29 as shown in FIG. 4.

The tightening bolt 26 has one end securely attached to the rear piston head body 19 and the other end adjustably abutting against the compression spring 21. Spring 21 has one end abutting the tightening bolt 26 and the other end abutting the tensioning ring 20. In order to tighten the upper outer surface 7 of head seal 5 against tank cylinder shell 3, a workman uses a torque wrench to tighten nut 27, thus compressing spring 21. When spring 21 is compressed, it pushes seal-tensioning annular T ring 20 from right to left on drawing FIG. 4, thus compressing head seal 5. When head seal 5 is compressed, the upper outer surface 7 of head seal 5 is pushed against the outer tank cylinder shell 3 to a sealable contact tightness determined by the workman. A tight seal between the piston head 4 and the outer container shell 3 is thus maintained for an effective discharging and wiping action.

Piston head 4 moves from right to left on drawing FIGS. 1 through 5 to discharge the viscous fluid located within cylinder tank 3. (The arrow in FIG. 1 shows the direction of movement for discharge.) The piston system is moved, as a unit, by air pressure in the amount of seven to eight pounds per square inch. The air pressure is introduced in back of the piston, towards the tractor of the tractor-trailer combination. When filling the cylinder, the viscous fluid (such as chocolate or peanut butter) is introduced into the inlet port 2. The pressure of the material being placed into cylinder tank 3 pushes the piston head 4 from left to right to load the material.

Since the piston head system described above is a freely moving system, a system mechanism for stabilizing the piston head such that its radial axis remains coincident with the diameter of the cylinder tank is required. The piston head system described herein is best shown in FIGS. 2 and 3. This piston head system includes the piston head 4, rear piston head body 19, front piston stabilizing shoes 30 and rear piston-stabilizing ring 38 and rear shoes 40.

Turning to FIG. 2, a front ring 37 and rear piston stabilizing ring 38 are shown. The front ring 37 is perpendicular to the cylindrical surface 3 of the tank and attached to the rear piston head body 19 and to stabilizing rods 39. To the rear of the front ring 37 are the front piston stabilizing shoes 30, as shown in the drawing figures. The stabilizing shoes 30 are located and secured around the rear piston head body at desired positions. The shoes 30 ride against the inner surface of the tank cylinder 3 and thus prevent the piston head 4 from becoming slanted as it moves down the cylindrical tank 3. It is a main object of these shoes to keep the axis of the piston head 4 parallel to and coincident with the center axis of the outer tank cylinder 3.

Figure 7:
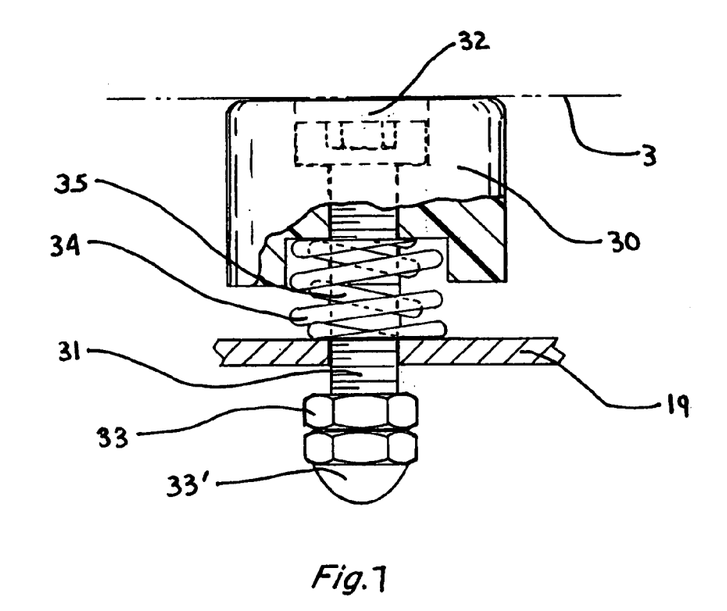
FIG. 7 is a side partially cut-away view of the piston-stabilizing shoe, bolts and springs for the front piston-stabilizing element.

As best shown in FIGS. 4 and 7, a front piston-stabilizing shoe 30 is illustrated. Each of the plurality of identical shoes 30 is attached around the rear piston head body 19 by front piston-stabilizing shoe bolts 31. Each bolt 31 is placed within a countersunk front piston stabilizing shoe aperture 32. As best shown in FIG. 7 the front stabilizing shoe 30 is secured to the rear piston head body 19 by bolt 31 and by bolt securing nuts. In the preferred embodiment, a hex nut 33 and an acorn nut 33' secure bolt 31 to rear piston head body 19.

In order to provide tension to the shoe 30 so that it remains in solid contact with the inner surface of the tank cylinder 3, the prior art teaches that a single spring is desirable. However, in actual practice, it has been found that the spring providing the resistance to the piston shoe would sometimes become "coil bound". When a spring becomes "coil bound" the spring bottoms out, which means that there would no longer be any tensioning left in the coiling process. By increasing the load strength on the spring from forty pounds (as taught in the prior art) to one hundred and sixty pounds, as taught innovatively here, and by providing an inner spring, coil binding is eliminated.

In the instant device, an outer stabilizing shoe counterclockwise wound spring 34 is provided along with an inner clockwise stabilizing spring 35. These springs are rated at one hundred and sixty pounds and are stainless steel. In addition, the springs have been passivated and made harder and more chemical resistant. The use of outer 34 counterclockwise wound springs in cooperation with inner 35 clockwise wound spring, operating together, create a much more efficient and reliable system of stabilizing the piston head. The outer spring 34 and inner spring 35 are located around the stabilizing bolt 31 and between the rear head body 19 and the shoe 30. The inner spring 35 is located within the outer spring 34.

Figure 8:
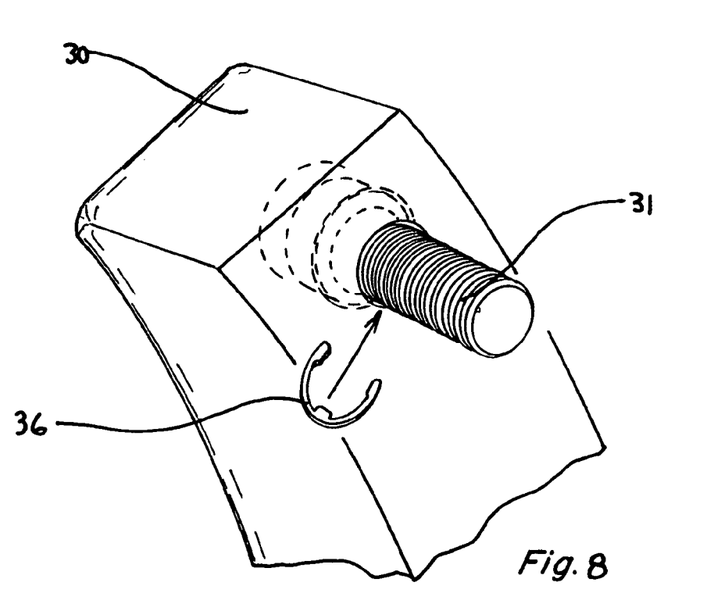
FIG. 8 is an exploded view of the stabilizing shoe and bolt system, showing the proper placement of the E-clamp.

As best shown in FIG. 8, an E-clamp 36 is inserted near the top head of front stabilizing shoe bolt 31. This E-clamp prevents the bolt 31 from being pushed onto the surface 3 of the tank cylinder. If the head of the bolt came into contact with the surface 3, the surface could be marred, thus debilitating the inner surface of the tank cylinder and the sealing process. The E-clamp is placed near the top of the threads of the bolt 31.

In order to provide even further stabilization for the axial travel of the piston head 4, stabilizing rods 39 connect a front ring 37 and a rear piston-stabilizing ring 38 for some applications, such as the discharge of viscous silicon. The rear piston-stabilizing ring 38 has rear piston stabilizing shoes 40 attached about the circumference of the rear ring 38 at desired intervals. These rear piston-stabilizing shoes 40 are similar to the front piston stabilizing shoes 30 except they are rectangular as shown on FIG. 2 rather than round. Each shoe 40 has two bolts with inner and outer springs for each bolt. The rear shoes are connected in the same manner, a bolt and inner clockwise and outer counterclockwise wound springs for each bolt to keep the shoes in contact with the inner cylinder surface 3.

As an added improvement to this device, a continuous essentially cylindrical Teflon™ protective cover 41 for the piston assembly has been provided. This Teflon™ cover 41 is best shown in drawing FIG. 3. The cover is a continuous, essentially cylindrical cover having two circumferential edges made of, preferably, Teflon™ as best shown on FIG. 3. A first circumferential piston head end edge 46 of the Teflon™ cover 41 is attached to the piston head back surface 12 as shown. A second rear tank circumferential edge 47 of the cover is attached to the front ring 37. Alternatively, the second circumferential edge 47 may be attached to a ring 48 located around the rods 39 halfway between the ring 37 and the ring 38. Each of the rings 37 and 48 is located to the rear (or right on the drawing figures) of the first back surface 12. This Teflon™ cover protects the piston head, seal, rear head body, tightening mechanism, front shoes and particularly the springs of the device.

The normal diameter of a tank cylinder, as shown by the dimension line in FIG. 2, is approximately sixty-eight to seventy-two inches with a length of approximately forty to forty-five feet. In a tank of this size, heavy viscous liquids may be discharged by moving piston head 4 from right to left (toward the outlet of the tank) using minimal pressure, usually seven to eight pounds per square inch of pressure. In the preferred embodiment, the length from the piston head front surface 11 to the rear of the rear piston-stabilizing ring 38 is approximately thirty-seven inches. The front and rear piston stabilizing rings are each approximately six inches in width.

In practice it has been found that two one-sixteenth inch stainless steel stabilizing rings 16 and 17 will keep the piston head seal in the proper configuration. One ring has been tried without success. The exact mechanism of the use of two rings is not known. However, it is believed that the rings work for and against each other such that tearing away of the seal from the piston head is prevented.

Specific improvements to the tank cylinder seal art have been shown and described above. The front leg of the seal is now double-banded to prevent any type of tearing away from the metal piston head back surface. The unitary construction of the T-configuration of the annular tensioning ring allows the compression mechanism to move smoothly, which in turn provides that the seal moves smoothly. The use of inner clockwise wound and outer counterclockwise wound tension springs to provide the resistance to the stabilizing shoes eliminates becoming coil binding. Increasing the load strength of the springs from forty to one-hundred and sixty pounds and providing stainless steel springs that have been passivated and made chemical resistant also is a great improvement over the prior art.

Having fully described my invention, I claim:

1. A sealing mechanism for a piston having a front head section with a front curved surface, a larger circular cross-section, a flat back surface and a smaller cylindrical rear head body, said piston moving axially in a tank cylinder having a circular cross-section that is slightly larger than the largest outer diameter of said piston head, said seal mechanism comprising:
   (1) a seal located on the back surface of said front head between said smaller rear head body and said tank cylinder, wherein said seal has an arcuate convex outer surface, an upper body, front and rear legs, an inner surface and an inner hollow area;
   (2) at least two annular stainless steel front leg rings located inside said front seal leg connected to said front leg and the flat back surface of said piston head by a nut and bolt;
   (3) a one-piece, T-shaped slidable annular rear tensioning ring slidably located around said rear head body and connected to the outside of the rear leg of said seal by a tensioning ring bolt and nut;
   (4) a tightening bolt having one end securely attached to said rear piston head body and the other end adjustably abutting against a tensioning spring;
   (5) a tensioning spring having one end abutting said tightening bolt and the other end abutting said tensioning ring bolt;
   (6) a stabilizing block having an essentially rectangular cross-section located inside of the inner hollow area of said seal;
   wherein the lower surface and lower part of said upper body has at least one inner groove cut therefrom;
   wherein the outer surface of said seal may be adjustably pushed in sealable contact with said cylinder body by turning said tightening bolt.

2. A sealing mechanism for a piston head as in claim 1, having three inner grooves.

3. A sealing mechanism for a piston head as in claim 1, wherein said stabilizing block is made of #60 durometer polyurethane.

4. A sealing mechanism for a piston head as in claim 3, wherein said stabilizing block has a cross-section of approximately two and one-half inches in length and seven-eighths inches in height.

5. A sealing mechanism for a piston head as in claim 1, wherein said front leg annular rings are each one-sixteenth inch thick and are made of passivated stainless steel.

6. A stabilizing mechanism for a piston having a front head with a front curved surface, a larger circular cross-section, a flat back surface and a smaller cylindrical rear head body, said piston moving axially in a tank cylinder having a circular cross-section that is slightly larger than the largest outer diameter of said piston head, said stabilizing mechanism comprising:
   (1) a plurality of front stabilizing shoes attached around said rear head body by a front stabilizing bolt;
   (2) an outer counterclockwise wound spring located around said stabilizing bolt and between said read head body and said shoe;
   (3) an inner clockwise wound tensioning spring located inside of said outer spring, around said stabilizing bolt and between said rear head body and said shoe;
   wherein said springs cooperate to prevent the coil-binding of said stabilizing shoes.

7. A stabilizing mechanism for a piston as in claim 6, wherein said shoe is countersunk and adapted to receive said front stabilizing bolt.

8. A stabilizing mechanism for a piston as in claim 6, wherein the strength of said springs is rated at 160 pounds.

9. A stabilizing mechanism for a piston as in claim 6, further comprising a rear stabilizing ring connected to said rear head body by stabilizing rods, and a plurality of rear stabilizing shoes, each rear shoe having an outer counter-clockwise wound spring located around said stabilizing bolt and between said rear head body and said shoe and an inner clockwise wound spring located inside of said outer spring, around said stabilizing bolt and between said rear head body and said shoe.

10. A stabilizing mechanism for a piston as in claim 9, wherein the strength of said springs is rated at 160 pounds.

11. A protective cover for a piston assembly having a front head with a front curved surface, a first circular cross-section, and a flat back surface, a cylindrical rear head body with a second circular cross-section, a piston seal, and a front ring, wherein said first circular cross-section is larger than said second circular cross-section, comprising a continuous, essentially cylindrical polytetrafluoroethylene cover having a first circumferential edge connected to the flat back surface of said piston head and a second circumferential edge connected to a T-shaped ring to the rear of said flat back surface.

* * * * *